Patented June 5, 1951

2,555,849

UNITED STATES PATENT OFFICE 2,555,849

ICE-CREAM STABILIZER

Elmer F. Glabe, Chicago, Ill., assignor to Food Technology, Inc., Chicago, Ill., a corporation of Illinois No Drawing. Application June 22, 1948, Serial No. 34,570

11 Claims. (Cl. 99—136)

This invention relates in general to the preparation of ice cream and more specifically to a stabilizer for addition to ice cream mixes for producing an ice cream of improved quality.

The manufacture of high quality ice cream is a very difficult and involved process. Ice cream is not simply a frozen natural product but is rather a judicious mixture of certain amounts of butter fat, non-fatty milk solids, such as protein, lactose and minerals, water and a number of other important ingredients present in lesser amounts such as salt and egg yolk. This is known as the ice cream mix which during the freezing operation is combined with various flavoring compounds to form the finished product. It will be noted that the ice cream mix contains a number of various materials which tend to remain in individual groups rather than to mix with one another to form a homogeneous mass. Intense physical mixing is not in itself enough to cause the various incompatible materials to form a homogeneous mass. It is only through processing and through the addition of a stabilizer that the non-fatty milk solids and water are completely dispersed and remain in complete dispersion throughout the entire process.

The proteins of milk (casein, albumin and globulin) normally hold large quantities of water. It is not too well known whether this is a chemical union or merely one of a physical nature which might be described as adsorption. The ability of the proteins to hold substantial quantities of water throughout the ice cream manufacturing process is of vast importance to the physical appearance and quality of the finished product. The natural tendency is for the water to separate from the protein during the freezing operation with the result that the water freezes into individual crystals, thereby imparting a rough texture to the finished ice cream. It is possible through the addition of a stabilizing agent to minimize or prevent the separation of water from the protein so that the mixture crystallizes into very tiny particles and the finished product is smooth and full-bodied. Therefore, it will be seen that the function of the ice cream stabilizer is to insure the formation of small crystals during the freezing operation and to prevent the separation of water from the other ingredients of the ice cream mix.

It is an object of this invention to provide an ice cream in which the materials are maintained in the form of a homogeneous mixture.

Another object of this invention is to provide a composition which may be added to ice cream mixes to assist in the formation and maintenance of a homogeneous ice cream mix.

Another object of this invention is to provide a composition which may be added to ice cream mixes to prevent a separation of the ingredients in the mix.

Still another object of this invention is to provide a composition which may be added to ice cream mixes to prevent the separation of water from the protein-water adsorption compound.

A further object of this invention is to provide a composition which may be added to ice cream mixes to prevent the development of coarse structure during successive raising and lowering of the temperature of the finished product.

A still further object of the invention is to provide a composition which may be added to ice cream mixes to permit rapid freezing of the mix without separation of the ingredients.

An additional object of the invention is to provide a composition which may be added to ice cream mixes to promote high and easily controlled over-run. Other objects will appear hereinafter.

In accordance with this invention, the process of making ice cream is carried out in the following manner. To 10% to 14% of butter fat is added 8% to 14% of serum solids (non-fatty milk solids such as protein, lactose, and minerals) about 16% of sugar and a small quantity of salt, generally about .03%, a small quantity (.1% to .65%) of a stabilizing composition, hereinafter described, and enough water to make a 100% mixture. The mixture is then introduced into a pasteurizing device such as a steam heated kettle where the temperature is maintained at about 165 degrees F. for about 30 minutes. The pasteurized mix is then passed through a homogenizer which breaks up and disperses the fat globules throughout the mixture. The homogenizer may be of standard construction and operates at a pressure of approximately 2500 pounds per square inch. The homogenized liquid is then passed immediately over a series of refrigerated coils wherein the temperature of the liquid is reduced to approximately 40 degrees F. The mix may now be frozen or it may be held at 40 degrees F. for a period of 5 to 6 hours before freezing, depending upon the type of stabilizer employed.

In the freezing operation the temperature of the mix is further reduced to about 23 degrees F. and at the same time a whipping action is employed to introduce a quantity of air into the mixture as it is being crystallized. The amount of air whipped into the ice cream, and particularly the amount of air retained in the ice cream during and after the freezing operation, materially affects the quality of the finished product. Flavoring ingredients are added to the liquid mix during the combination freezing and whipping operation. The partially frozen ice cream which at 24 degrees F. is still in a flowing state, is then poured into containers or molds, after which the temperature is reduced to −15 or −20 degrees F. until the freezing operation has been completed.

From the nature of the ingredients of the ice cream mix it will be apparent to one familiar with the chemical arts that the preparation of a homogeneous mixture of the ingredients presents a difficult problem. Butter fat, water, protein, etc., are not mutually soluble and have a strong tendency to remain in separate groups instead of dispersing with one another. This tendency to separate into individual groups becomes more pronounced as the temperature is lowered. Therefore, it will be seen that an attempt to freeze a mixture of the ingredients of the usual ice cream mix will result in separation of the ingredients and the breakdown of the mixture. It has long been known that the addition of a stabilizing agent will assist in the dispersion of the ingredients within one another. Stabilizers used thus far in the ice cream industry have been principally gelatin of animal origin, and various natural gum materials such as locust bean, tragacanth, agar, extract of Irish moss (carragheen), sodium alginate and other like materials.

The stabilizers which have been previously employed suffer numerous disadvantages and limitations. For instance, with the use of gelatin it is necessary to hold the mix above the freezing point for 6 hours or longer in order to allow for aging the mixture. This, of course, is a serious disadvantage from an operational viewpoint, and, at the same time, it provides additional opportunities for the mixture to separate. The natural gum materials, besides being expensive to use in the quantities required, are adversely affected by a number of the ingredients which may be present in the usual ice cream mix. Gelatin and sodium alginate require premixing with water before addition to the ice cream mix. Furthermore, sodium alginate cannot be added until the pasterization mixture is brought to 160° F. because precipitation of calcium alginate may occur. Gelatin and sodium alginate tend to produce heavy viscous mixes in the cooling operation. A good ice cream stabilizer should be easy to add to the ice cream mix, and it should not produce an overly viscous mix during the homogenization and subsequent cooling. It should not require aging, and if it does, should not permit separation of the mix nor should it produce thickening during the aging period. It should permit rapid freezing of the mix and should promote an over-run development which will be easy to control. It should protect the ice cream against normal heat shock; that is, the effect of subsequent raising and lowering of the temperature of the frozen product.

I have now found that stabilization of ice cream mixes may be very satisfactorily accomplished by the use of a special product which I have developed in connection with this invention. The product has very special properties which result from the use of a combination of ingredients chosen for their highly specific activity. The ingredients are blended with one another in specific proportions so that unusually good results are obtained when this product is employed as a stabilizer. Satisfactory results may be obtained by the use of from 0.1% to 0.65% of my improved stabilizer, which is made up of the following ingredients:

(1) Irish moss extract of about 2% to 15% based on weight of the stabilizer composition or of about .007% to .05% based on the total weight of the ice cream mix. The Irish moss extract reacts with the milk proteins by forming gelatinous substances. I have found that the use of this extract in conjunction with partially refined corn starch, which contains approximately 8% protein, forms a much closer chemical union with the milk proteins thereby insuring greater water adsorption and closer and more permanent union with the water. Irish moss extract is prepared by cooking Irish moss at about 180 degrees F. to 200 degrees F. in water, filtering to remove solid bodies such as sand, etc., and drum or spray drying the product.

(2) Carboxymethylcellulose is employed in the proportion of about 2% to 20% based on the weight of the stabilizer composition or of .015% to .15%, based upon the total weight of the ice cream mixture. The function of the carboxymethylcellulose is not thoroughly understood. It is believed, however, that the fibers of this material adsorb sufficient water to form a matrix or brush-heap structure, which possibly enmeshes the water swollen proteins, thereby preventing their water fractions from coalescing. Using more than .15% of carboxymethylcellulose makes for a tougher ice cream while using less than .015% results in understabilization.

(3) Soya whipping protein, mostly globulin, is employed within the range of about 0.1% to 1.5% based on the weight of the stabilizer composition or of .0004% to .006%, based upon the total weight of the ice cream mix. The whipping protein promotes the beating operation with consequent rapid build-up of the amount of air whipped into the ice cream. It also promotes the retention of the entrained air during the freezing operation. Increasing the quantity of whipping protein above .006% results in loss of control of the over-run.

(4) Potassium bicarbonate is employed within the range of about 1% to 20%, based on the weight of the stabilizing composition or of .004% to .08%, based upon the total weight of the ice cream mix and sodium citrate within the range of about 5% to 35% based on the weight of the stabilizing composition or of .02% to .08% based upon the total weight of the ice cream mix. The function of these two chemical salts is that of a buffer and to precipitate the soluble calcium and magnesium salts from the ice cream mix. The amount of buffer salts required will depend, of course, upon the concentration of calcium and magnesium salts in the ice cream mix. This is an important feature of the invention since the soluble calcium and magnesium salts have a destabilizing effect on the carboxymethylcellulose and on the milk proteins.

(5) Partially refined corn starch is employed within the range of about 33% to 90%, based on the weight of the stabilizing composition or of .125% to .33%, based upon the weight of the total ice cream mix. The partially refined corn starch should contain between 1% and 7% of protein which has remained in the starch during the partial refining of the crude product. A very desirable partially refined corn starch containing the required amount of protein may be obtained from waxy maize corn. The protein in this product forms a chemical union between the milk protein and the Irish moss.

The following examples will serve to illustrate a number of the ice cream stabilizer compositions which I have prepared for the practice of the invention. It should be understood that the invention in its broader aspects is not limited to the specific proportions disclosed in these examples, but that I present these examples in order to fully disclose the invention. In the following examples, the stabilizer compositions were prepared by blending the ingredients and incorporating the resultant composition into an ice cream mix compounded and processed in the manner previously described. The figures in column A represent the percentage composition by weight based upon the total weight of the ice cream mix, and the figures in column B represent the percentage of the ingredients in the stabilizer composition:

*Example I*

|  | A | B |
|---|---|---|
|  | Per cent | Per cent |
| Carboxymethylcellulose | .015 | 7.65 |
| Irish Moss Extract | .008 | 3.85 |
| Soya Whipping Protein | .001 | 0.38 |
| Potassium Bicarbonate | .009 | 4.60 |
| Sodium Citrate | .038 | 19.00 |
| Partially Refined Corn Starch | .130 | 64.52 |

*Example II*

|  | A | B |
|---|---|---|
|  | Per cent | Per cent |
| Carboxymethylcellulose | .019 | 7.65 |
| Irish Moss Extract | .010 | 3.85 |
| Soya Whipping Protein | .001 | 0.38 |
| Potassium Bicarbonate | .012 | 4.60 |
| Sodium Citrate | .047 | 19.00 |
| Gelatinized Corn Flour | .161 | 64.52 |

*Example III*

|  | A | B |
|---|---|---|
|  | Per cent | Per cent |
| Carboxymethylcellulose | .015 | 4.90 |
| Irish Moss Extract | .008 | 2.62 |
| Soya Whipping Protein | .001 | 0.32 |
| Potassium Bicarbonate | .009 | 2.94 |
| Sodium Citrate | .038 | 12.40 |
| Partially Refined Corn Starch | .130 | 42.40 |
| 300 Mesh Soya Flour | .105 | 34.42 |

*Example IV*

|  | A | B |
|---|---|---|
|  | Per cent | Per cent |
| Carboxymethylcellulose | .015 | 6.75 |
| Irish Moss Extract | .008 | 3.35 |
| Soya Whipping Protein | .001 | 0.38 |
| Potassium Bicarbonate | .009 | 4.00 |
| Sodium Citrate | .038 | 16.02 |
| Gelatinized Wheat Starch | .161 | 69.50 |

*Example V*

|  | A | B |
|---|---|---|
|  | Per cent | Per cent |
| Carboxymethylcellulose | .015 | 6.75 |
| Irish Moss Extract | .008 | 3.35 |
| Soya Whipping Protein | .001 | 0.38 |
| Potassium Bicarbonate | .009 | 4.00 |
| Sodium Citrate | .038 | 16.07 |
| Partially Refined Corn Starch | .050 | 23.15 |
| 300 Mesh Soya Flour | .050 | 23.15 |
| Gelatinized Wheat Starch | .050 | 23.15 |

*Example VI*

|  | A | B |
|---|---|---|
|  | Per cent | Per cent |
| Carboxymethylcellulose | .015 | 6.75 |
| Irish Moss Extract | .008 | 3.35 |
| Soya Whipping Protein | .001 | 0.38 |
| Potassium Bicarbonate | .009 | 4.00 |
| Sodium Citrate | .038 | 16.02 |
| Potato Starch | .145 | 63.00 |
| 300 Mesh Soya Flour | .016 | 6.50 |

A number of alternate ingredients may be successfully employed in place of those previously disclosed. For example, hydroxyethylcellulose may be employed in the place of carboxymethylcellulose or the sodium or potassium salts of either of these compounds may be employed. Other gums may be employed in place of the Irish moss extract, e. g., locust bean gum, tragacanth, agar, etc. All of the above mentioned materials may be referred to generally as hemicellulosic materials. The alkali carbonate or bicarbonate salts may be used in place of potassium bicarbonate, and the alkali citrates may be used in place of sodium citrate. A number of substitutes may be employed for the partially refined corn starch. For example, gelatinized corn flour, gelatinized wheat starch or corn starch, finely ground fat-free soya flour, or other starches or flours which contain a small amount of protein, may be substituted for the partially refined corn starch. It is contemplated that one skilled in the art may choose to blend these flours and starches in any number of conceivable variations.

The novel stabilizing compositions herein disclosed are especially well adapted for use in preparing sherbets and ices having smooth texture, solid body and little tendency to develop heat shock. For use in sherbets the stabilizing compositions are usually employed in the concentration of from 0.15% to 0.65% by weight based on the total weight of the sherbet mix.

The unusual effect of a stabilizer composition comprising the herein disclosed ingredients is of vast importance to the ice cream manufacturing industry. When used in the manufacture of commercial ice cream the stabilizing compositions, which are the subject of this invention, produce an ice cream of smooth texture, solid body, and decreased tendency to develop heat shock effects. Additionally, the ice cream mix may be frozen rapidly, and the amount of air introduced may be easily controlled. I have found that the unusually efficient operation of my stabilizing compositions depends upon the unique combination of ingredients which I employ. The stabilizing action cannot be attained by the use of the ingredients alone but depends upon the combination of them. For instance, I have found that carboxymethylcellulose or Irish moss extract if used alone give inferior results compared to the compositions of this invention. Twenty to thirty times as much when used alone will not give results as good as the small amounts employed in my compositions.

The invention is hereby claimed as follows:

1. A stabilizing composition for ice cream consisting essentially of approximately 7.65% by weight of carboxymethylcellulose, approximately 3.85% Irish moss extract, approximately .38% soya whipping protein, approximately 4.60% potassium bicarbonate, approximately 19.00% sodium citrate and approximately 64.52% partially refined corn starch having a small proportion of protein therein, said bicarbonate and said citrate being present in a quantity sufficient to precipitate the soluble calcium and magnesium from the ice cream mix.

2. A stabilizing composition for ice cream consisting essentially of from 2% to 20% by weight of carboxymethylcellulose, from 2% to 15% by weight of Irish moss extract, from 0.1% to 1.5% by weight of soya whipping protein, from 1% to 20% by weight of potassium bicarbonate, from 5% to 35% by weight of sodium citrate and from 33% to 90% by weight of partially refined corn starch having a small proportion of protein therein, said bicarbonate and said citrate being present in a quantity sufficient to precipitate the soluble calcium and magnesium from the ice cream mix.

3. A stabilizing composition for ice cream consisting essentially of a minor quantity of hemicellulosic material, a small quantity of soya whipping protein, a quantity of alkali carbonate and alkali citrate buffer salts sufficient to precipitate the soluble calcium and magnesium from the ice cream mix, and a major quantity of a partially refined corn starch having a small proportion of protein therein.

4. The process of making ice cream which comprises adding to an ice cream mix a small amount of the stabilizing composition of claim 2.

5. The process of making ice cream which comprises adding to an ice cream mix the stabilizing composition of claim 2 in the proportion of 0.1% to 0.65% by weight based on the total weight of the ice cream mix.

6. An ice cream mix consisting essentially of butter fat, water, milk solids, sugar, and salt, and a small amount of the stabilizing composition of claim 2.

7. An ice cream mix consisting essentially of the usual proportions of butter fat, water, milk solids, sugar, and salt, and the stabilizing composition of claim 2 in the proportion of 0.1% to 0.65% by weight based on the total weight of the ice cream mix.

8. An ice cream mix consisting essentially of the usual proportions of butter fat, water, milk solids, sugar, and salt, and the stabilizing composition of claim 2 in the proportion of 0.30% by weight based on the total weight of the ice cream mix.

9. A frozen mix consisting essentially of the usual proportions of milk solids, sugar, water, and salt, and a small amount of the stabilizing composition of claim 2.

10. A frozen mix consisting essentially of the usual proportions of milk solids, sugar, water, and salt, and the stabilizing composition of claim 2 in the proportion of 0.15% to 0.65% by weight based on the total weight of the frozen mix.

11. A frozen mix consisting essentially of the usual proportions of milk solids, sugar, water, and salt, and the stabilizing composition of claim 1 in the proportion of 0.35% by weight based on the total weight of the frozen mix.

ELMER F. GLABE.

REFERENCES CITED

The following references are of record in the file of this patent:

UNITED STATES PATENTS

| Number | Name | Date |
|---|---|---|
| 1,216,052 | Beckman et al. | Feb. 13, 1917 |
| 2,097,229 | Lucas et al. | Oct. 26, 1937 |
| 2,097,231 | Lucas | Oct. 26, 1937 |
| 2,176,024 | Musher | Oct. 10, 1939 |
| 2,201,064 | Thurman | May 14, 1940 |
| 2,395,061 | Musher | Feb. 19, 1946 |
| 2,430,553 | Bigelow | Nov. 11, 1947 |
| 2,433,276 | Hipple | Dec. 23, 1947 |
| 2,445,226 | Landers | July 13, 1948 |

OTHER REFERENCES

"Organic Chemistry" by Paul Karrer, 2nd English edition, published by authority A. P. Custodian, 1946, Elsevier Publishing Co., New York, N. Y., page 352.